(12) United States Patent
Hatanaka et al.

(10) Patent No.: US 9,616,386 B2
(45) Date of Patent: Apr. 11, 2017

(54) CATALYST FOR PURIFICATION OF EXHAUST GAS, NOX STORAGE-REDUCTION CATALYST, AND METHOD FOR PURIFYING EXHAUST GAS

(71) Applicant: KABUSHIKI KAISHA TOYOTA CHUO KENKYUSHO, Nagakute-shi, Aichi (JP)

(72) Inventors: Miho Hatanaka, Nagakute (JP); Toshiyuki Tanaka, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/061,102

(22) Filed: Mar. 4, 2016

(65) Prior Publication Data
US 2016/0279573 A1    Sep. 29, 2016

(30) Foreign Application Priority Data

Mar. 23, 2015 (JP) .................. 2015-060073
Feb. 3, 2016 (JP) .................. 2016-019192

(51) Int. Cl.

| B01D 53/94 | (2006.01) |
| F01N 3/10 | (2006.01) |
| F01N 3/28 | (2006.01) |
| B01J 21/04 | (2006.01) |
| B01J 21/06 | (2006.01) |
| B01J 23/02 | (2006.01) |
| B01J 23/04 | (2006.01) |
| B01J 23/10 | (2006.01) |
| B01J 23/42 | (2006.01) |
| B01J 23/44 | (2006.01) |
| B01J 23/56 | (2006.01) |
| B01J 23/58 | (2006.01) |
| B01J 23/63 | (2006.01) |
| B01J 37/02 | (2006.01) |
| B01J 37/03 | (2006.01) |
| F01N 3/08 | (2006.01) |
| B01J 35/00 | (2006.01) |
| B01J 35/10 | (2006.01) |

(52) U.S. Cl.
CPC ..... *B01D 53/9481* (2013.01); *B01D 53/9422* (2013.01); *B01J 21/066* (2013.01); *B01J 23/10* (2013.01); *B01J 23/42* (2013.01); *B01J 23/44* (2013.01); *B01J 23/58* (2013.01); *B01J 23/63* (2013.01); *B01J 37/0203* (2013.01); *B01J 37/0205* (2013.01); *B01J 37/0248* (2013.01); *B01J 37/03* (2013.01); *F01N 3/0814* (2013.01); *F01N 3/0842* (2013.01); *F01N 3/10* (2013.01); *F01N 3/2803* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/20707* (2013.01); *B01D 2255/20715* (2013.01); *B01D 2255/40* (2013.01); *B01D 2255/91* (2013.01); *B01J 35/006* (2013.01); *B01J 35/0006* (2013.01); *B01J 35/1019* (2013.01); *B01J 2523/00* (2013.01); *F01N 2330/00* (2013.01); *F01N 2370/02* (2013.01); *F01N 2510/068* (2013.01)

(58) Field of Classification Search
CPC ........ B01J 21/04; B01J 21/063; B01J 21/066; B01J 23/02; B01J 23/04; B01J 23/10; B01J 23/42; B01J 23/44; B01J 23/56; B01J 23/58; B01J 23/63; B01D 53/9422; B01D 53/9481; F01N 3/10; F01N 3/2803
See application file for complete search history.

(56) References Cited

U.S. PATENT DOCUMENTS

| 6,159,897 | A | 12/2000 | Suzuki et al. | |
| 6,306,794 | B1 * | 10/2001 | Suzuki | B01D 53/9413 501/105 |
| 6,797,668 | B2 * | 9/2004 | Yoshikawa | B01D 53/945 502/302 |
| 6,808,687 | B1 * | 10/2004 | Uenishi | B01D 53/945 422/177 |
| 7,037,875 | B2 * | 5/2006 | Hu | B01D 53/945 502/304 |
| 7,220,702 | B2 * | 5/2007 | Hara | B01D 53/8628 502/302 |
| 7,229,947 | B2 * | 6/2007 | Hara | B01D 53/8628 502/327 |
| 7,393,809 | B2 * | 7/2008 | Kim | B01D 53/945 502/216 |
| 7,504,355 | B2 * | 3/2009 | Carter | B01J 23/40 502/300 |

(Continued)

FOREIGN PATENT DOCUMENTS

| EP | 1470859 A1 | 10/2004 |
| EP | 2695674 A1 | 2/2014 |

(Continued)

OTHER PUBLICATIONS

Aug. 12, 2016 Extended Search Report issued in European Patent Application No. 16159191.2.

*Primary Examiner* — Cam N. Nguyen
(74) *Attorney, Agent, or Firm* — Oliff PLC

(57) ABSTRACT

A catalyst for purification of exhaust gas, comprising a first catalyst comprising:
a first catalyst support comprising
a first composite oxide composed of alumina, zirconia, and titania, and
ceria supported on a surface of the first composite oxide in an amount of 0.5 to 10 parts by mass relative to 100 parts by mass of the first composite oxide; and
a first noble metal supported on a surface of the first catalyst support in an amount of 0.05 to 5.0 parts by mass in terms of metal relative to 100 parts by mass of the first catalyst support.

14 Claims, No Drawings

(56) References Cited

U.S. PATENT DOCUMENTS

| | | | | |
|---|---|---|---|---|
| 7,618,919 B2* | 11/2009 | Shimazu | B01J 23/63 | 502/302 |
| 8,038,951 B2* | 10/2011 | Wassermann | B01J 21/066 | 422/168 |
| 8,158,551 B2* | 4/2012 | Verdier | B01D 53/945 | 502/302 |
| 8,551,910 B2* | 10/2013 | Raffy | C04B 35/465 | 422/177 |
| 8,728,435 B2* | 5/2014 | Larcher | B01D 53/945 | 423/594.12 |
| 8,771,624 B2* | 7/2014 | Ikeda | B01J 23/63 | 423/213.5 |
| 8,795,619 B2* | 8/2014 | Suzuki | B01D 53/9445 | 422/177 |
| 8,833,064 B2* | 9/2014 | Galligan | B01D 53/945 | 423/213.5 |
| 8,853,120 B2* | 10/2014 | Aoki | B01D 53/945 | 502/302 |
| 8,999,886 B2* | 4/2015 | Takeshima | B01D 53/945 | 502/302 |
| 9,011,809 B2* | 4/2015 | Ito | B01D 53/9436 | 422/170 |
| 9,012,350 B2* | 4/2015 | Aoki | B01D 53/865 | 502/304 |
| 9,308,516 B2* | 4/2016 | Houshito | B01J 23/63 | |
| 9,333,461 B2* | 5/2016 | Castagnola | B01J 35/0006 | |
| 9,409,152 B2* | 8/2016 | Kumatani | B01J 21/066 | |
| 9,486,791 B2* | 11/2016 | Swallow | B01J 37/0228 | |
| 9,527,034 B2* | 12/2016 | Bergeal | B01D 53/945 | |
| 9,527,035 B2* | 12/2016 | Bergeal | B01D 53/945 | |
| 2012/0270730 A1* | 10/2012 | Imoto | B01J 21/063 | 502/351 |
| 2014/0030158 A1 | 1/2014 | Takagi et al. | | |
| 2016/0001275 A1 | 1/2016 | Goto et al. | | |

FOREIGN PATENT DOCUMENTS

| | | |
|---|---|---|
| EP | 2959969 A1 | 12/2015 |
| JP | 2004-321847 A | 11/2004 |
| JP | 2006043637 A | 2/2006 |
| JP | 2008-137886 A | 6/2008 |
| WO | 2014/129634 A1 | 8/2014 |

\* cited by examiner

CATALYST FOR PURIFICATION OF EXHAUST GAS, NOX STORAGE-REDUCTION CATALYST, AND METHOD FOR PURIFYING EXHAUST GAS

BACKGROUND OF THE INVENTION

Field of the Invention

The present invention relates to a catalyst for purification of exhaust gas. More specifically, the present invention relates to: a catalyst for purification of exhaust gas, comprising a noble metal and a catalyst support comprising ceria supported on a surface of a composite oxide composed of alumina, zirconia, and titania; a NOx storage-reduction catalyst comprising the catalyst for purification of exhaust gas and a NOx storage material; and a method for purifying exhaust gas by using the NOx storage-reduction catalyst.

Related Background Art

To purify harmful hydrocarbons (HC) and carbon monoxide (CO) contained in exhaust gas from an internal combustion engine, catalysts for purification of exhaust gas have been utilized in the combustion reaction. Moreover, to purify harmful nitrogen oxides (NOx) contained in oxygen-excessive exhaust gas, NOx storage-reduction catalysts capable of subjecting NOx to storage reaction and/or reduction reaction have been utilized. However, exhaust gas contains $SO_2$ generated by burning sulfur contained in a fuel, and this $SO_2$ brings about a problem that such a catalyst for purification of exhaust gas and a NOx storage material are poisoned and deteriorate. For this reason, a catalyst support containing titania has been used in the catalysts for purification of exhaust gas and NOx storage-reduction catalysts which are required to have a sulfur-poisoning resistance.

For example, Japanese Unexamined Patent Application Publication No. 2004-321847 (Patent Literature 1) discloses, as a NOx storage-reduction catalyst having a sulfur-poisoning resistance, a catalyst comprising: a catalyst support comprising a composite oxide composed of alumina, zirconia, and titania, at least a part of the titania being dissolved in the alumina in the form of solid solution; and a noble metal and a NOx storage material which are supported on the catalyst support.

Moreover, Japanese Unexamined Patent Application Publication No. 2008-137886 (Patent Literature 2) discloses a catalyst for purification of exhaust gas (NOx storage-reduction catalyst), comprising Pt, Ce, and Ba supported on a support comprising alumina, a zirconia-titania composite oxide, Rh-supporting zirconia, and a ceria-zirconia composite oxide.

SUMMARY OF THE INVENTION

However, when the NOx storage-reduction catalyst described in Patent Literature 1 is exposed to high temperature, the noble metal is likely to undergo grain growth, and the catalytic activity decreases in some cases. Further, the NOx storage-reduction catalyst described in Patent Literature 2 is likely to be poisoned by sulfur, and is inferior in sulfur desorbing performance in a reduction treatment, so that the NOx purifying activity decreases in some cases in a NOx treatment in the co-existence of sulfur.

The present invention has been made in view of the above-described problems of the conventional techniques. An object of the present invention is to provide: a catalyst for purification of exhaust gas, which exhibits a high heat resistance and a high catalytic activity; a NOx storage-reduction catalyst, which exhibits a high NOx purifying performance even when the catalyst is exposed to sulfur; and a method for purifying exhaust gas by using the NOx storage-reduction catalyst.

The present inventors have conducted intensive study to achieve the above object. As a result, the inventors have found out that a catalyst for purification of exhaust gas, which comprises a noble metal supported on a catalyst support comprising a predetermined amount of ceria supported on a surface of a composite oxide composed of alumina, zirconia, and titania, exhibits a high heat resistance and a high catalytic activity. Further, the inventors have found out that a NOx storage-reduction catalyst comprising the catalyst for purification of exhaust gas and a NOx storage material promotes sulfur desorption during a reduction treatment, readily recovers the catalytic performance, and exhibits a high NOx purifying activity even when the NOx storage-reduction catalyst is exposed to sulfur. These findings have led to the completion of the present invention.

Specifically, a catalyst for purification of exhaust gas of the present invention comprises a first catalyst comprising:
  a first catalyst support comprising
    a first composite oxide composed of alumina, zirconia, and titania, and
    ceria supported on a surface of the first composite oxide in an amount of 0.5 to 10 parts by mass relative to 100 parts by mass of the first composite oxide; and
  a first noble metal supported on a surface of the first catalyst support in an amount of 0.05 to 5.0 parts by mass in terms of metal relative to 100 parts by mass of the first catalyst support.

In the catalyst for purification of exhaust gas of the present invention, an amount of the ceria supported per specific surface area of the first composite oxide is preferably 0.4 to 5 $\mu mol/(m^2/g)$. Moreover, after the catalyst for purification of exhaust gas is introduced into a mixture solution containing concentrated nitric acid and concentrated hydrochloric acid at a volume ratio of 1:3 and left standing for one hour, an amount of cerium eluted into a filtrate is preferably 5% or more relative to a total amount of cerium in the catalyst for purification of exhaust gas. Further, a molar ratio between the cerium and the first noble metal (Ce/first noble metal) is preferably 0.5 to 10.

In addition, in the catalyst for purification of exhaust gas of the present invention, the first composite oxide preferably has an alumina content of 30 to 70% by mass. Furthermore, the titania preferably accounts for 20 to 60 mol % of a total amount of the zirconia and the titania in the first composite oxide.

A NOx storage-reduction catalyst of the present invention comprises:
  the catalyst for purification of exhaust gas of the present invention; and
  at least one NOx storage material selected from the group consisting of alkali metals and alkaline earth metals.

In the NOx storage-reduction catalyst of the present invention, the catalyst for purification of exhaust gas may comprise two or more types of the first catalyst. Moreover, the NOx storage material is preferably supported on a surface of the first catalyst. Further, a content of the NOx storage material is preferably 0.01 to 0.3 mol per 100 g of the first catalyst.

In addition, the NOx storage-reduction catalyst of the present invention preferably further comprises a second catalyst comprising:
  a second catalyst support comprising a second composite oxide composed of alumina, zirconia, and titania but not comprising ceria; and a second noble metal supported on a surface of the second catalyst support. Furthermore, the NOx storage material is preferably supported on a surface of the second catalyst. Additionally, an amount of the NOx storage material supported is preferably 0.01 to 0.3 mol per 100 g of the first catalyst and the second catalyst in total.

A method for purifying exhaust gas of the present invention comprises bringing exhaust gas containing nitrogen oxide and sulfur oxide into contact with such a NOx storage-reduction catalyst of the present invention.

Note that although it is not exactly clear why the catalyst for purification of exhaust gas of the present invention exhibits a high heat resistance and a high catalytic activity, and why the NOx storage-reduction catalyst of the present invention exhibits a high NOx purifying activity even when exposed to sulfur, the present inventors speculate as follows. Specifically, in the catalyst for purification of exhaust gas of the present invention, the catalyst support has ceria supported on the surface of the composite oxide composed of alumina, zirconia, and titania, and the noble metal is supported on the surface of the catalyst support. Accordingly, the inventors speculate that even when the catalyst is exposed to high temperature, the anchoring effect of this ceria suppresses the grain growth of the noble metal, so that a high heat resistance and a high catalytic activity are developed. In contrast, when a catalyst support comprising a composite oxide composed of alumina, zirconia, and titania but not supporting ceria is exposed to high temperature, a noble metal supported on the surface of the catalyst support undergoes grain growth, so that the catalytic activity decreases presumably.

Moreover, in the NOx storage-reduction catalyst of the present invention, the amount of the ceria supported is lowered to 10 parts by mass or less relative to 100 parts by mass of the composite oxide. This makes it possible not only to use a reducing agent in a minimum required amount to reduce the ceria, but also to eliminate the sulfur poisoning with the reducing agent in the minimum required amount, accordingly suppressing a decrease in a fuel efficiency. Further, since the grain growth of the noble metal can be suppressed, the NO oxidation-reduction site is sufficiently kept, thereby developing a high NOx purifying activity as a NOx storage-reduction catalyst having a high heat resistance and sulfur-poisoning resistance presumably.

The present invention makes it possible to provide: a catalyst for purification of exhaust gas, which exhibits a high heat resistance and a high catalytic activity; a NOx storage-reduction catalyst, which exhibits a high NOx purifying performance even when the catalyst is exposed to sulfur; and a method for purifying exhaust gas by using the NOx storage-reduction catalyst.

DETAILED DESCRIPTION OF THE PREFERRED EMBODIMENTS

Hereinafter, the present invention will be described in detail based on preferred embodiments thereof.

First, a catalyst for purification of exhaust gas and a NOx storage-reduction catalyst of the present invention will be described. The catalyst for purification of exhaust gas of the present invention comprises a first catalyst comprising:
a first catalyst support comprising
a first composite oxide composed of alumina, zirconia, and titania, and
ceria supported on a surface of the first composite oxide; and
a first noble metal supported on a surface of the first catalyst support. Moreover, the NOx storage-reduction catalyst of the present invention comprises:
such a catalyst for purification of exhaust gas of the present invention; and
at least one NOx storage material selected from the group consisting of alkali metals and alkaline earth metals.

By using the first catalyst support comprising the first composite oxide composed of alumina, zirconia, and titania (hereinafter abbreviated as "first AZT composite oxide") and ceria supported on the surface of the first AZT composite oxide, the catalyst for purification of exhaust gas of the present invention comprising the noble metal supported on the first catalyst support exhibits a high heat resistance and a high catalytic activity. Moreover, the NOx storage-reduction catalyst of the present invention comprising the catalyst for purification of exhaust gas and the NOx storage material suppresses the grain growth of the noble metal. Thus, the NOx storage-reduction catalyst of the present invention is excellent in NOx storage performance in a lean atmosphere at low temperature, and is capable of increasing an amount of NOx reduced in a rich atmosphere. Moreover, even when the catalyst is exposed to sulfur, a high NOx purifying activity is exhibited.

In the catalyst for purification of exhaust gas and the NOx storage-reduction catalyst of the present invention, an amount of the ceria supported in the first catalyst support is 0.5 to 10 parts by mass relative to 100 parts by mass of the first AZT composite oxide. If the amount of the ceria supported in the first catalyst support is less than the lower limit, when exposed to high temperature, the catalysts do not sufficiently exhibit the effect of suppressing the grain growth of the first noble metal supported on the surface of the first catalyst support, so that the catalytic activity and the NOx purifying activity decrease. On the other hand, if the amount of the ceria supported in the first catalyst support exceeds the upper limit, when the ceria is reduced, oxygen is released, so that a reducing agent is consumed. This makes it necessary to introduce a reducing agent for sufficient metalation (activation) of the first noble metal in the catalyst for purification of exhaust gas, which causes a decrease in the fuel efficiency. The same applies to a decrease in the fuel efficiency in the NOx storage-reduction catalyst. Particularly, in the NOx storage-reduction catalyst of the present invention, the amount of the ceria supported in the first catalyst support within the above-described range makes it possible to suppress the consumption of the reducing agent when the ceria is reduced because the amount of the ceria supported is small. In addition, in rich combustion control for NOx reduction and sulfur poisoning recovery, the reducing agent is not wastefully burned and consumed, and is efficiently utilized to reduce nitrogen oxide and sulfur oxide, so that a decrease in the fuel efficiency is suppressed. Hence, the NOx storage-reduction catalyst of the present invention not only exhibits a high NOx purifying activity, but also promotes the desorption of adherent sulfur and exhibits a high heat resistance and sulfur-poisoning resistance. From these viewpoints, the amount of the ceria supported in the first catalyst support is preferably 1 to 8 parts by mass, more preferably 2 to 7 parts by mass, relative to 100 parts by mass of the first AZT composite oxide.

Moreover, in the catalyst for purification of exhaust gas and the NOx storage-reduction catalyst of the present invention, the amount of the ceria supported per specific surface area of the first AZT composite oxide in the first catalyst support is preferably 0.4 to 5 $\mu mol/(m^2/g)$, more preferably 0.7 to 4 $\mu mol/(m^2/g)$, and particularly preferably 1 to 3.5

μmol/(m²/g). If the amount of the ceria supported per specific surface area of the first AZT composite oxide is less than the lower limit, when the catalysts are exposed to high temperature, there is a tendency that the grain growth of the first noble metal supported on the surface of the first catalyst support is not suppressed, so that the catalytic activity and the NOx purifying activity decrease. On the other hand, if the amount of the ceria supported per specific surface area of the first AZT composite oxide exceeds the upper limit, an extra reducing agent is required for the metalation (activation) of the noble metal. There are tendencies not only that the fuel efficiency decreases, but also that it is difficult to support the ceria in a highly dispersed state on the surface of the first AZT composite oxide.

A dispersed state of the ceria on the surface of the catalyst support can be grasped by immersing the catalyst for purification of exhaust gas of the present invention in a mixture solution of concentrated nitric acid and concentrated hydrochloric acid for a certain time, and measuring a proportion of cerium eluted relative to a total amount of cerium in the catalyst for purification of exhaust gas (Ce elution ratio). Specifically, 1 g of the catalyst for purification of exhaust gas is added to 10 ml of a mixture solution containing concentrated nitric acid and concentrated hydrochloric acid at a volume ratio of 1:3 and left standing for one hour, followed by filtration. The resulting filtrate is subjected to inductively coupled plasma (ICP) emission spectrometry to measure an amount of cerium eluted. Meanwhile, 1 g of the catalyst for purification of exhaust gas is all dissolved in 10 ml of the mixture solution containing concentrated nitric acid and concentrated hydrochloric acid at a volume ratio of 1:3, and a total amount of cerium in the catalyst for purification of exhaust gas is measured by the ICP emission spectrometry. From the amount of cerium eluted and the total amount of cerium thus obtained, a Ce elution ratio (the amount of cerium eluted/the total amount of cerium×100) is calculated. In the catalyst for purification of exhaust gas and the NOx storage-reduction catalyst of the present invention, the Ce elution ratio is preferably 5% or more, more preferably 10% or more, still more preferably 15% or more, and particularly preferably 20% or more. The Ce elution ratio within the above-described range means that the surface of the AZT composite oxide is coated with the ceria in a predetermined supported amount in a highly dispersed state. Note that the upper limit of the Ce elution ratio is not particularly limited, but is preferably 50% or less.

In the catalyst for purification of exhaust gas and the NOx storage-reduction catalyst of the present invention, examples of the first noble metal in the first catalyst include Au, Ag, and platinum-group elements such as Pt, Pd, and Rh. From the viewpoint that a high catalytic activity and a high NOx purifying activity are obtained, platinum-group elements are preferable, Pt and Pd are more preferable, and Pt is particularly preferable. One of such noble metals may be used alone, or two or more thereof may be used in combination. Moreover, an amount of such a first noble metal(s) supported in the first catalyst is 0.05 to 5.0 parts by mass in terms of metal relative to 100 parts by mass of the first catalyst support. If the amount of the first noble metal(s) supported in the first catalyst is less than the lower limit, a high catalytic activity and a high NOx purifying activity are not obtained. On the other hand, if the amount of the first noble metal(s) supported in the first catalyst exceeds the upper limit, this makes it difficult to suppress the grain growth of the first noble metal, and the catalytic activity and the NOx purifying activity per unit amount of the noble metal decrease. Thus, the amount of the first noble metal(s) supported in the first catalyst is preferably 0.1 to 3 parts by mass, more preferably 0.2 to 2.5 parts by mass, and particularly preferably 0.25 to 2 parts by mass, in terms of metal relative to 100 parts by mass of the first catalyst support, from the viewpoints that a high catalytic activity and a high NOx purifying activity are obtained, and that even when the catalysts are exposed to high temperature, the grain growth of the first noble metal supported on the surface of the first catalyst support is sufficiently suppressed, making it possible to maintain the catalytic activity and the NOx purifying activity per unit amount of the noble metal.

Further, in the catalyst for purification of exhaust gas and the NOx storage-reduction catalyst of the present invention, a molar ratio between the cerium and the first noble metal (Ce/first noble metal) in the first catalyst is preferably 0.5 to 10, more preferably 1 to 8, and particularly preferably 2 to 7, from the viewpoint of an interaction between the noble metal and the cerium. If the molar ratio between the cerium and the first noble metal in the first catalyst is less than the lower limit, when the catalysts are exposed to high temperature, there is tendency that the grain growth of the first noble metal supported on the surface of the first catalyst support is not suppressed, so that the catalytic activity and the NOx purifying activity decrease. On the other hand, if the molar ratio between the cerium and the first noble metal in the first catalyst exceeds the upper limit, the reducing agent for the metalation (activation) of the noble metal tends to be consumed for releasing of oxygen when the ceria is reduced, and the fuel efficiency tends to decrease.

In the catalyst for purification of exhaust gas of the present invention, one type of the first catalyst may be used alone, or two or more types thereof may be used in combination. Furthermore, the catalyst for purification of exhaust gas of the present invention may be used in combination with a second catalyst comprising:

a second catalyst support comprising a second composite oxide composed of alumina, zirconia, and titania (hereinafter abbreviated as "second AZT composite oxide") but not comprising ceria; and a second noble metal supported on a surface of the second catalyst support. In the case where the first catalyst and the second catalyst are used in combination, a content of the first catalyst is preferably 5 to 95% by mass, more preferably 10 to 90% by mass, relative to 100% by mass of the first catalyst and the second catalyst in total, from the viewpoint that a high catalytic activity is obtained.

Furthermore, the NOx storage-reduction catalyst of the present invention comprises: the catalyst for purification of exhaust gas of the present invention; and at least one NOx storage material selected from the group consisting of alkali metals and alkaline earth metals. In the NOx storage-reduction catalyst of the present invention, one type of the first catalyst may be used alone, or two or more types of thereof may be used in combination, as the catalyst for purification of exhaust gas. Alternatively, the catalyst for purification of exhaust gas of the present invention comprising one type or two or more types of the first catalyst may be used in combination with the second catalyst. In the case where the first catalyst and the second catalyst are used in combination, the content of the first catalyst is preferably 5 to 95% by mass, more preferably 10 to 90% by mass, relative to 100% by mass of the first catalyst and the second catalyst in total, from the viewpoint that a high NOx purifying activity is obtained.

In the catalyst for purification of exhaust gas and the NOx storage-reduction catalyst of the present invention, the second AZT composite oxide may be the same as or different from the first AZT composite oxide in regard to proportions of alumina, zirconia, and titania. Moreover, examples of the second noble metal include those exemplified as the first noble metal. From the viewpoint that a high NOx purifying activity is obtained, platinum-group elements are preferable, and Pt, Pd, and Rh are more preferable. One of such noble metals may be used alone, or two or more thereof may be used in combination. Further, the second noble metal may be the same as or different from the first noble metal. An amount of such a second noble metal supported in the second catalyst is preferably 0.05 to 5.0 parts by mass, more preferably 0.1 to 3 parts by mass, further preferably 0.2 to 2.5 parts by mass, and particularly preferably 0.25 to 2 parts by mass, in terms of metal relative to 100 parts by mass of the second catalyst support. If the amount of the second noble metal supported in the second catalyst is less than the lower limit, there is a tendency that a high catalytic activity and a high NOx purifying activity are not obtained. On the other hand, if the amount of the second noble metal supported in the second catalyst exceeds the upper limit, the grain growth of the second noble metal tends to proceed, so that it is difficult to suppress decreases in the catalytic activity and the NOx purifying activity.

Examples of the NOx storage material in the NOx storage-reduction catalyst of the present invention include: alkali metals such as lithium, sodium, potassium, rubidium, and cesium; and alkaline earth metals such as barium, magnesium, calcium, and strontium. One of such NOx storage materials may be used alone, or two or more thereof may be used in combination. The NOx storage-reduction catalyst of the present invention preferably comprises barium from the viewpoint of developing a high NOx storage performance.

Moreover, the NOx storage material is preferably supported on a surface of the first catalyst. In the case where the first catalyst and the second catalyst are used in combination, the NOx storage material is preferably supported on the surface of at least one (more preferably both) of these catalysts. These enhance the NOx purifying activity.

A content of such a NOx storage material is preferably 0.01 to 0.3 mol, more preferably 0.03 to 0.2 mol, and particularly preferably 0.05 to 0.15 mol, per 100 g of the first catalyst (when used in combination with the second catalyst, a total of these). If the content of the NOx storage material is less than the lower limit, there is a tendency that a high NOx storage performance is not obtained. On the other hand, if the content of the NOx storage material exceeds the upper limit, it tends to be difficult to support the NOx storage material in a highly dispersed state.

Examples of the first and the second AZT composite oxides according to the present invention include composite oxides of alumina, zirconia, and titania mixed at a nano level. Moreover, in the AZT composite oxides, a part of the titania is preferably dissolved in the alumina also in the form of solid solution. This suppresses the adherence of sulfur oxide to the alumina and the zirconia, and facilitates the desorption of sulfur oxide adherent to the alumina and the zirconia, enhancing the sulfur-poisoning resistance of the NOx storage-reduction catalyst.

The AZT composite oxides have an alumina content of preferably 30 to 70% by mass, more preferably 40 to 60% by mass, relative to 100% by mass of the AZT composite oxides. If the alumina content is less than the lower limit, there is a tendency that the alumina does not act as a diffusion barrier of a zirconia-titania solid solution, so that the heat resistance of the catalyst for purification of exhaust gas decreases. On the other hand, if the alumina content exceeds the upper limit, the sulfur-poisoning resistance of the NOx storage-reduction catalyst tends to decrease.

Further, in the AZT composite oxides, the titania accounts for preferably 20 to 60 mol %, more preferably 30 to 50 mol %, of a total amount of the zirconia and the titania (or the mass of the zirconia-titania solid solution). If the proportion of the titania is less than the lower limit, the sulfur-poisoning resistance of the NOx storage-reduction catalyst tends to decrease. On the other hand, if the proportion of the titania exceeds the upper limit, the heat resistance of the catalyst for purification of exhaust gas tends to decrease.

Note that a molar ratio of the alumina, the zirconia, and the titania in the AZT composite oxides with the alumina content and the proportion of the titania within the above-described ranges is alumina/zirconia/titania=29.9 to 71.6/15.0 to 47.8/8.5 to 35.0 (mol %) as the widest range, and alumina/zirconia/titania=39.9 to 61.9/20.1 to 40.7/11.4 to 30.1 (mol %) as the narrowest range.

Such AZT composite oxides can be prepared, for example, by the method described in JP2004-321847A. Specifically, using a solution (preferably, aqueous solution) containing an aluminium salt (for example, aluminium nitrate), a zirconium salt (for example, zirconium oxynitrate), and titanium salt (for example, titanium tetrachloride), a precipitate is formed by a coprecipitation method. The precipitate thus obtained is calcined to thereby obtain an AZT composite oxide. Then, a titania precursor (for example, titanium alkoxide) is supported on the obtained AZT composite oxide, followed by calcining, and a part of the titania is dissolved in the alumina and the zirconia in the form of solid solution. In this manner, a NOx storage-reduction catalyst excellent in sulfur-poisoning resistance can be obtained.

Next, a method for producing the catalyst for purification of exhaust gas of the present invention will be described. The catalyst for purification of exhaust gas of the present invention can be produced, for example, by a method comprising the steps of:

obtaining a first catalyst support comprising a predetermined amount of ceria supported on a surface of a first composite oxide composed of alumina, zirconia, and titania (first AZT composite oxide) by impregnating the first AZT composite oxide with a solution in which a raw-material cerium salt is dissolved (hereinafter referred to as "ceria precursor solution"), and heating the resultant; and obtaining a first catalyst by supporting a predetermined amount of a first noble metal on a surface of the first catalyst support.

Examples of the raw-material cerium salt used in the production of the catalyst for purification of exhaust gas of the present invention include cerium acetate, cerium nitrate, and the like. An example of a solvent for dissolving the raw-material cerium salt includes water. Moreover, the ceria precursor solution may contain a compound having a polydentate ligand. Further, in order to surely dissolve the raw-material cerium salt in the aqueous solution, an appropriate amount of ammonia water may be added. Here, the term polydentate ligand refers to one capable of coordinating through two or more coordinating groups. Adding such a compound having a polydentate ligand to the ceria precursor solution can enhance the solubility of the raw-material cerium salt. Examples of the compound having a polydentate ligand include: polycarboxylic acids such as citric acid and oxalic acid; diols such as glycol and pinacol; diamines such as ethylenediamine; esters having two carbonyl groups such as ethyl acetoacetate; and the like. Among these, preferable are citric acid, oxalic acid, succinic acid, maleic acid, malic acid, adipic acid, tartaric acid, malonic acid, fumaric acid, aconitic acid, glutaric acid, ethylenediaminetetraacetic acid, lactic acid, glycolic acid, glyceric acid, salicylic acid, mevalonic acid, ethylenediamine, ethyl acetoacetate, malonic acid ester, glycol, and pinacol. From the viewpoint of being carboxylic acids having a hydroxy group also, more preferable are citric acid, lactic acid, malic acid, tartaric acid, glycolic acid, and salicylic acid. Note that one of the compounds having a polydentate ligand may be used alone, or two or more thereof may be used in combination. In the ceria precursor solution, a content of the compound having a polydentate ligand is preferably an equimolar equivalent or more of the raw-material cerium salt.

The method for impregnating the AZT composite oxide with the ceria precursor solution is not particularly limited, but preferable is a method in which the AZT composite oxide is immersed in the ceria precursor solution. The AZT composite oxide impregnated with the ceria precursor solution in this manner is dried as necessary. Then, the resultant is heated in the air. Thus, the catalyst support according to the present invention (ceria-supporting AZT composite oxide) is obtained in which the ceria is supported on the surface of the AZT composite oxide. The heating temperature is preferably 200 to 800° C., and the heating time is preferably 1 to 10 hours.

In the method for producing the catalyst for purification of exhaust gas of the present invention, the method for supporting the noble metal on the surface of the first catalyst support is not particularly limited, and known methods can be employed. For example, the first catalyst support is impregnated with a solution (preferably, aqueous solution) containing a salt (for example, dinitrodiammine salt) or a complex (tetraammine complex) of the noble metal, and then dried and calcined. In this manner, a first catalyst can be obtained in which the noble metal is supported on the surface of the first catalyst support. A concentration of the noble metal in the solution containing the noble metal is adjusted as appropriate in accordance with the amount of the noble metal supported and an amount of the solution containing the noble metal with which the AZT composite oxide is impregnated.

Moreover, the second catalyst, which may be used in combination with the catalyst for purification of exhaust gas of the present invention, can be produced, for example, by a method comprising the step of obtaining a second catalyst by supporting a second noble metal on a surface of a second catalyst support comprising a second composite oxide composed of alumina, zirconia, and titania (second AZT composite oxide) but not comprising ceria. The method for supporting the noble metal on the surface of the second catalyst support is not particularly limited, and an example thereof includes the same method as the method for supporting the noble metal on the surface of the first catalyst support.

Next, a method for producing the NOx storage-reduction catalyst of the present invention will be described. The NOx storage-reduction catalyst of the present invention can be produced, for example, by mixing (for example, powder-mixing) the catalyst for purification of exhaust gas of the present invention comprising one type or two or more types of the first catalyst with at least one NOx storage material selected from the group consisting of alkali metals and alkaline earth metals. From the viewpoint of enhancing the NOx purifying activity, the NOx storage-reduction catalyst of the present invention is preferably produced in such a manner that the NOx storage material is supported on the surface of the first catalyst, for example, by: impregnating the catalyst for purification of exhaust gas of the present invention comprising one type or two or more types of the first catalyst with a solution (preferably, aqueous solution) containing the NOx storage material, and then drying and calcining the resultant.

Further, in the case where the first catalyst and the second catalyst are used in combination in the NOx storage-reduction catalyst of the present invention, for example, a mixture of the first catalyst and the second catalyst may be mixed (for example, powder-mixing) with the NOx storage material. Alternatively, from the viewpoint of enhancing the NOx purifying activity, the NOx storage material is preferably supported on the surface of at least one catalyst (more preferably both) of the first catalyst and the second catalyst, for example, by: impregnating at least one catalyst (more preferably both) of the first catalyst and the second catalyst with the solution (preferably, aqueous solution) containing the NOx storage material, and then drying and calcining the resultant.

The solution containing the NOx storage material is a solution containing at least one metal compound of alkali metal compounds and alkaline earth metal compounds. Examples of the alkali metal compounds include hydroxides, acetates, carbonates, nitrates, and the like of alkali metals. Examples of the alkaline earth metal compounds include hydroxides, acetates, carbonates, nitrates, and the like of alkaline earth metals. One of such alkali metal compounds and alkaline earth metal compounds may be used alone, or two or more thereof may be used in combination. A concentration of the NOx storage material in the solution containing the NOx storage material is adjusted as appropriate in accordance with the amount of the NOx storage material supported and an amount of the solution containing the NOx storage material with which the AZT composite oxide is impregnated.

Furthermore, when the NOx storage material is supported on both the catalyst surfaces of the first catalyst and the second catalyst, after the NOx storage material is supported on the surface of the first catalyst and the NOx storage material is supported on the surface of the second catalyst, these may be mixed. Alternatively, after the first catalyst and the second catalyst are mixed, this mixture may be impregnated with the solution containing the NOx storage material, and then dried and calcined.

Exhaust gas can be purified by bringing the exhaust gas into contact with such a catalyst for purification of exhaust gas or a NOx storage-reduction catalyst of the present invention. The catalyst for purification of exhaust gas of the present invention has a high heat resistance, and is accordingly suitable for purification of exhaust gas in an environment exposed to high temperature. Moreover, in a purification treatment of exhaust gas containing a sulfur component also, the NOx storage-reduction catalyst of the present invention is capable of breaking down and desorbing the sulfur component (such as sulfur oxide) with a small amount of a reducing agent. For this reason, the NOx storage-reduction catalyst of the present invention is suitable for purification of exhaust gas containing a nitrogen compound, sulfur oxide, and an excessive amount of oxygen, for example, exhaust gas emitted from an internal combustion engine of an automobile or other similar sources, and other exhaust gases.

EXAMPLES

Hereinafter, the present invention will be described more specifically on the basis of Examples and Comparative Examples. However, the present invention is not limited to the following Examples. Here, an amount of ceria supported, an elution ratio of ceria, an amount of noble metal supported, and an amount of barium supported were measured by the following methods.

(1) Amount of Ceria Supported and Amount of Noble Metal Supported

In 10 ml of a mixture solution containing concentrated nitric acid and concentrated hydrochloric acid at a volume ratio of 1:3, 1 g of a catalyst was all dissolved, and a content of each element was determined by inductively coupled plasma (ICP) emission spectrometry. Based on the element contents, the mass of the AZT composite oxide was determined in terms of a total mass of $Al_2O_3$, $ZrO_2$, and $TiO_2$. In addition, the mass of the ceria was determined in terms of the mass of $CeO_2$. Thus, an amount of the ceria supported was calculated relative to 100 parts by mass of the AZT composite oxide. Further, the mass of the catalyst support (ceria-supporting AZT composite oxide) was determined in terms of a total mass of $Al_2O_3$, $ZrO_2$, $TiO_2$, and $CeO_2$. In addition, the mass of the noble metal was determined in terms of metal. Thus, an amount of the noble metal supported was calculated relative to 100 parts by mass of the catalyst support.

(2) Ce Elution Ratio

After 1 g of a catalyst was added into 10 ml of a mixture solution containing concentrated nitric acid and concentrated hydrochloric acid at a volume ratio of 1:3 and left standing for one hour, the resultant was filtered. The resulting filtrate was subjected to the ICP emission spectrometry to determine an amount of each element eluted. The obtained amount of Ce eluted was divided by the Ce content, which had been determined by the ICP emission spectrometry when all of the catalyst was dissolved in (1) above. Thus, a proportion of the amount of Ce eluted in an elution test (Ce elution ratio) was determined relative to a total amount of Ce in the catalyst.

(3) Amount of Barium Supported

An amount of barium supported in a catalyst was determined from an amount of an aqueous solution of barium acetate with which the catalyst was impregnated.

Preparation Example 1

To 2000 ml of ion-exchanged water, 441.2 g of aluminium nitrate nonahydrate, 233.3 g of an 18% by mass solution of zirconium oxynitrate, and 65.4 g of titanium tetrachloride were added and stirred. Further, 154 g of 30% by mass hydrogen peroxide water was added thereto. The resulting aqueous solution was neutralized with 456 g of 25% by mass ammonia water, and a precipitate was prepared by a coprecipitation method. The precipitate thus obtained was kept together with a solvent (water) at 2 atm in a 120° C. atmosphere for 2 hours for maturation. Then, the precipitate was collected by centrifugation and subsequently precalcined at 150° C. for 7 hours. Thereafter, the resultant was calcined in the air at 400° C. for 5 hours, and further calcined at 800° C. for 5 hours. Thus, an AZT composite oxide was obtained. This AZT composite oxide was ground into a powder having a median diameter D50 of 22.5 µm by using a wet ball mill.

The AZT composite oxide powder has a composition of $Al_2O_3$:$ZrO_2$:$TiO_2$=50:35:15 at a mass ratio determined from each element content by the ICP emission spectrometry. An alumina content thereof was 50% by mass relative to 100% by mass of the AZT composite oxide, and the titania accounted for 39.8 mol % of a total amount of the zirconia and the titania. Moreover, the AZT composite oxide powder has a specific surface area of 112.5 $m^2$/g determined by the BET method.

Example 1

The AZT composite oxide powder obtained in Preparation Example 1 was impregnated with a ceria precursor solution, and then dried and heated to prepare a catalyst support in which ceria was supported on a surface of the AZT composite oxide powder (ceria-supporting AZT composite oxide powder). Specifically, first, a predetermined amount of cerium acetate and citric acid in 3.9 times equivalent amounts thereto were added to a predetermined amount of ion-exchanged water. Further, 25% by mass ammonia water was added to dissolve cerium acetate. Thereby, a ceria precursor solution was prepared. The AZT composite oxide powder was impregnated with this ceria precursor solution. The Ce concentration in the ceria precursor solution was set such that when 100 parts by mass of the AZT composite oxide powder was impregnated with the ceria precursor solution, an amount of the ceria supported was 0.7 parts by mass. Next, the AZT composite oxide powder impregnated with the ceria precursor solution was dried at 110° C. Further, the temperature was raised from room temperature to 500° C. at a rate of 100° C./hour, and was kept at 500° C. for 2 hours. Thus, a catalyst support was obtained in which the ceria was supported on the surface of the AZT composite oxide powder (ceria-supporting AZT composite oxide powder). This catalyst support had a BET specific surface area of 113.6 $m^2$/g.

Next, the catalyst support was immersed in an aqueous solution obtained by diluting an aqueous solution of dinitrodiammine platinum (Pt concentration: 4.538% by mass) with ion-exchanged water to adsorb Pt to the catalyst support. The obtained Pt-adsorbed catalyst support was dried at 110° C. Further, the temperature was raised from room temperature to 500° C. at a rate of 100° C./hour, and was kept at 500° C. for 2 hours. Thus, a catalyst for purification of exhaust gas was obtained in which Pt was supported on a surface of the catalyst support. This catalyst for purification of exhaust gas was powder-compacted, and ground pellets having a diameter of 0.5 to 1 mm were obtained.

Table 1 shows the amount of the ceria supported relative to 100 parts by mass of the AZT composite oxide powder, an amount of the ceria supported per specific surface area of the AZT composite oxide, a Ce elution ratio, an amount of Pt supported relative to 100 parts by mass of the catalyst support, and a molar ratio between Ce and Pt (Ce/Pt), in the catalyst for purification of exhaust gas.

Example 2

A catalyst for purification of exhaust gas in which Pt was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 2.6 parts by mass. Note that the catalyst support had a BET specific surface area of 113.1 $m^2$/g. Table 1 shows the physical properties of the obtained catalyst for purification of exhaust gas.

Example 3

A catalyst for purification of exhaust gas in which Pt was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 4.2 parts by mass. Note that the catalyst support had a BET specific surface area of 112 $m^2/g$. Table 1 shows the physical properties of the obtained catalyst for purification of exhaust gas.

Example 4

A catalyst for purification of exhaust gas in which Pt was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 7.0 parts by mass. Note that the catalyst support had a BET specific surface area of 108.8 $m^2/g$. Table 1 shows the physical properties of the obtained catalyst for purification of exhaust gas.

Example 5

A catalyst for purification of exhaust gas in which Pt was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 9.3 parts by mass. Note that the catalyst support had a BET specific surface area of 109.8 $m^2/g$. Table 1 shows the physical properties of the obtained catalyst for purification of exhaust gas.

Example 6

A catalyst for purification of exhaust gas in which Pt was supported on a surface of a catalyst support composed of a ceria-supporting AZT composite oxide powder was prepared in the same manner as in Example 3, except that a solution obtained by dissolving a predetermined amount of cerium nitrate in ion-exchanged water was used as the ceria precursor solution. Note that the catalyst support had a BET specific surface area of 115 $m^2/g$. Table 1 shows the physical properties of the obtained catalyst for purification of exhaust gas.

Example 7

A catalyst for purification of exhaust gas in which Pt and Pd were supported on a surface of a catalyst support composed of a ceria-supporting AZT composite oxide powder was prepared in the same manner as in Example 3, except that the aqueous solution of dinitrodiammine platinum (Pt concentration: 4.538% by mass) and an aqueous solution of dinitrodiammine palladium (Pd concentration: 4.5% by mass) were used in place of the aqueous solution of dinitrodiammine platinum. Note that the catalyst support had a BET specific surface area of 112 $m^2/g$. Table 1 shows the physical properties of the obtained catalyst for purification of exhaust gas.

Comparative Example 1

A catalyst in which Pt was supported on a surface of an AZT composite oxide powder was prepared in the same manner as in Example 1, except that the AZT composite oxide powder obtained in Preparation Example 1 was used as the catalyst support in place of the catalyst support in which the ceria was supported on the surface of the AZT composite oxide powder. Table 1 shows the physical properties of the obtained catalyst.

Comparative Example 2

A catalyst in which Pt and Pd were supported on the surface of the AZT composite oxide powder obtained in Preparation Example 1 was prepared in the same manner as in Comparative Example 1, except that the aqueous solution of dinitrodiammine platinum (Pt concentration: 4.5380 by mass) and an aqueous solution of dinitrodiammine palladium (Pd concentration: 4.5 by mass) were used in place of the aqueous solution of dinitrodiammine platinum. Table 1 shows the physical properties of the obtained catalyst.

TABLE 1

| | Amount of ceria supported relative to 100 parts by mass of AZT composite oxide [parts by mass] | Amount of ceria supported per specific surface area of AZT composite oxide [μmol/($m^2$/g)] | Ce elution ratio [%] | Amount of noble metal supported relative to 100 parts by mass of catalyst support | | Ce/noble metal [mol/mol] |
|---|---|---|---|---|---|---|
| | | | | type | [parts by mass] | |
| Ex. 1 | 0.7 | 0.3 | 27.1 | Pt | 1.13 | 0.7 |
| Ex. 2 | 2.6 | 1.3 | 25.4 | Pt | 1.10 | 2.6 |
| Ex. 3 | 4.2 | 2.2 | 22.6 | Pt | 1.09 | 4.2 |
| Ex. 4 | 7.0 | 3.8 | 18.2 | Pt | 1.08 | 6.8 |
| Ex. 5 | 9.3 | 4.9 | 13.8 | Pt | 1.06 | 9.0 |
| Ex. 6 | 4.2 | 2.1 | 15.0 | Pt | 1.09 | 4.2 |
| Ex. 7 | 4.2 | 2.2 | 20.5 | Pt | 1.11 | 3.0 |
| | | | | Pd | 0.22 | |
| Comp. Ex. 1 | 0.0 | 0.0 | — | Pt | 1.12 | 0.0 |

TABLE 1-continued

| | Amount of ceria supported relative to 100 parts by mass of AZT composite oxide [parts by mass] | Amount of ceria supported per specific surface area of AZT composite oxide [μmol/(m²/g)] | Ce elution ratio [%] | Amount of noble metal supported relative to 100 parts by mass of catalyst support | | Ce/noble metal [mol/mol] |
|---|---|---|---|---|---|---|
| | | | | type | [parts by mass] | |
| Comp. Ex. 2 | 0.0 | 0.0 | — | Pt | 1.15 | 0.0 |
| | | | | Pd | 0.23 | |

As is apparent from the results shown in Table 1, as the amount of the ceria supported was increased relative to 100 parts by mass of the AZT composite oxide, the Ce elution ratio was gradually decreased. This means that increasing the amount of the ceria supported decreases the degree of the ceria dispersed, and that there is an upper limit for the amount of the ceria supported from the viewpoint of reforming the surface of the AZT composite oxide. In other words, it was found that, in order to support ceria in a highly dispersed state on the surface of the AZT composite oxide while developing the effect by increasing the amount of the ceria supported, the amount of the ceria supported had to be controlled within an appropriate range.

<Thermal Durability Test (1)>

After 2 g of each of the obtained catalysts was packed into a silica glass tube, a lean gas [$O_2$ (7%)/NO (400 ppm)/CO (0.01%)/$C_3H_6$ (0.06%)/$CO_2$ (11%)/$H_2O$ (3%)/$N_2$ (balance)] and a rich gas [NO (400 ppm)/$H_2$ (2%)/CO (6%)/$C_3H_6$ (0.32%)/$CO_2$ (11%)/$H_2O$ (3%)/$N_2$ (balance)] were alternately allowed to flow through the catalyst at a rate of 500 ml/minute at intervals of lean/rich=11 minutes/1 minute. The temperature was raised from room temperature to 750° C. over one hour, and was kept at 750° C. for 5 hours. Thereafter, the catalyst was allowed to cool to room temperature.

<X-Ray Diffraction Measurement>

After the thermal durability test (1), the catalysts were each subjected to a powder X-ray diffraction (XRD) measurement using a powder X-ray diffraction apparatus (manufactured by Rigaku Corporation, "horizontal sample mounting-type X-ray diffraction apparatus Ultima IV R285") under the conditions of X-ray source: CuKα radiation (λ=0.154 nm), acceleration voltage: 40 kV, and acceleration current: 40 mA. Table 2 shows diffraction peak intensities derived from Pt (111) in the obtained XRD pattern and Pt particle diameters each calculated from a half width of the peak intensity.

<Catalytic Performance Evaluation Test (1)>

After the thermal durability test (1), the catalysts were each placed in a fixed bed flow type reactor. The catalyst amount was set to 1 g for the catalyst of Comparative Example 1. As for other catalysts (Examples 1 to 5), the catalyst amounts were set such that each Pt amount was equal to that of the catalyst of Comparative Example 1. While a model gas [CO (800 ppm)/$O_2$ (10%)/$CO_2$ (10%)/$H_2O$ (3%)/$N_2$ (balance)] was allowed to flow through the catalyst at a rate of 5 L/minute, the temperature was raised at a rate of 20° C./minute. When 50% of CO was purified, the catalyst temperature was measured. Table 2 shows the result.

On the other hand, the catalysts after the thermal durability test (1) were each placed in the fixed bed flow type reactor in the same manner as described above. A reducing gas [$H_2$ (1%)/$CO_2$ (10%)/$H_2O$ (3%)/$N_2$ (balance)] was allowed to flow through the catalyst for 10 minutes with an entry gas temperature of 400° C. to perform a reduction pretreatment. While the model gas was allowed to flow through the catalyst after the reduction pretreatment, the temperature was raised in the same manner as described above. When 50% of CO was purified, the catalyst temperature was measured. Table 2 shows the result.

<Catalytic Performance Evaluation Test (2)>

The catalysts after the thermal durability test (1) were each placed in the fixed bed flow type reactor in the same manner as in the catalytic performance evaluation test (1). A $O_2$-containing gas [$O_2$ (1%)/$N_2$ (balance)], a $N_2$ gas, a CO-containing gas [CO (1%)/$N_2$ (balance)], and a $N_2$ gas were repeatedly allowed to flow through the catalyst with an entry gas temperature of 400° C. at a gas flow rate of 5 L/minute at intervals of $O_2$-containing gas/$N_2$ gas/CO-containing gas/$N_2$ gas=60 seconds/20 seconds/60 seconds/20 seconds. An amount of $CO_2$ generated when CO was introduced was measured, and an amount of oxygen stored (OSC amount) was calculated. Table 2 shows the result.

TABLE 2

| | Pt (111)-derived diffraction peak intensity [count] | Pt particle diameter [nm] | 50%-CO purified temperature | | OSC amount (400° C.) [μmol/g] |
|---|---|---|---|---|---|
| | | | immediately after thermal durability test (1) [° C.] | after reduction pretreatment [° C.] | |
| Ex. 1 | 4849 | 20 | 185 | 179 | 19.9 |
| Ex. 2 | 4065 | 17 | 179 | 162 | 23.1 |
| Ex. 3 | 3382 | 15 | 172 | 142 | 32.7 |
| Ex. 4 | 2894 | 12 | 166 | 124 | 45.1 |
| Ex. 5 | 2421 | 12 | 160 | 115 | 52.6 |
| Ex. 6 | 3455 | 13 | — | — | — |
| Ex. 7 | 2398 | 13 | — | — | — |
| Comp. Ex. 1 | 3642 | 18 | 190 | 179 | 18.9 |
| Comp. Ex. 2 | 5475 | 15 | — | — | — |

As is apparent from the results shown in Table 2, as the amount of the ceria supported was increased, the diffraction peak intensity derived from Pt (111) was decreased, and the Pt particle diameter calculated from the half width of the diffraction peak was also decreased (Examples 1 to 5). This revealed that the grain growth of the noble metal (Pt) was suppressed by the anchoring effect of the ceria supported in a highly dispersed state on the surface of the AZT composite oxide powder. In other words, it was found that an appropriate amount of ceria corresponding to the amount of Pt supported had to be supported from the viewpoint of suppressing the Pt grain growth. Moreover, in the case where the type of the ceria precursor was changed (Examples 3 and 6) also, the Pt particle diameter was decreased in comparison with the case where the catalyst support comprising no ceria was used (Comparative Example 1). This revealed that the addition of ceria suppressed the grain growth of the noble metal (Pt). Further, in the case where Pt and Pd were supported as the noble metals also, the use of the catalyst support comprising the ceria supported on the surface of the AZT composite oxide powder (Example 7) decreased the particle diameters of Pt and Pd in comparison with the case of using the catalyst support comprising no ceria (Comparative Example 2). This revealed that the addition of ceria suppressed the grain growth of the noble metals (Pt and Pd).

In addition, the 50%-CO purified temperature immediately after the thermal durability test (1) was decreased as the amount of the ceria supported was increased (Examples 1 to 5, Comparative Example 1), revealing that suppressing the grain growth of the noble metal suppressed the deterioration of the catalytic activity. Furthermore, the 50%-CO purified temperatures after the reduction pretreatment were lower than the 50%-CO purified temperatures immediately after the thermal durability test (1) (Examples 1 to 5, Comparative Example 1). This revealed that the reduction pretreatment enhanced the catalytic activity. This is conceivably because of the metalation of the noble metal, which serves as an active site, by the reduction pretreatment.

On the other hand, as the amount of the ceria supported was increased, the OSC amount was increased (Examples 1 to 5, Comparative Example 1). It was found that a reducing agent had to be introduced for the metalation of the noble metal. Although a reducing agent has to be introduced to a catalyst exposed to a lean burn atmosphere for sufficient metalation of an active species such as a noble metal, introducing the reducing agent may decrease the fuel efficiency. Hence, it was found that an appropriate amount of the ceria supported had to be selected to achieve both the enhancement of the catalyst durability and the suppression of a decrease in the fuel efficiency. Nevertheless, even if the OSC amount obtained in Example 5 was assumedly all attributable to the ceria in the catalyst for purification of exhaust gas, the OSC amount was about ¼ of a theoretical OSC amount, and the OSC amount for 10 seconds after introducing CO was about 1/10 thereof.

Preparation Example 2

The AZT composite oxide powder obtained in Preparation Example 1 was immersed in an aqueous solution of rhodium nitrate (Rh concentration: 2.75% by mass) to adsorb Rh to the AZT composite oxide powder. The obtained Rh-adsorbed AZT composite oxide powder was dried at 110° C. Further, the temperature was raised from room temperature to 500° C. at a rate of 100° C./hour, and was kept at 500° C. for 2 hours. Thus, a catalyst was obtained in which Rh was supported on the surface of the AZT composite oxide powder (Rh-supporting AZT composite oxide powder). An amount of Rh supported in this catalyst was 1 part by mass relative to 100 parts by mass of the AZT composite oxide powder.

Example 8

A mixture of the catalyst for purification of exhaust gas (Pt-supporting, ceria-containing AZT composite oxide powder) of Example 1 after the thermal durability test (1) and the catalyst obtained in Preparation Example 2 (Rh-supporting AZT composite oxide powder) was impregnated with an aqueous solution of barium acetate, and then dried and heated to prepared a NOx storage-reduction catalyst in which barium was supported as a NOx storage material on surfaces of the Pt-supporting, ceria-containing AZT composite oxide powder and the Rh-supporting AZT composite oxide powder (hereinafter abbreviated as "NSR (NOx-Storage and Reduction) catalyst"). Specifically, first, 3.03 g of the catalyst for purification of exhaust gas of Example 1 after the thermal durability test (1) and 0.43 g of the catalyst obtained in Preparation Example 2 were powder-mixed, and the resulting mixture was impregnated with an aqueous solution containing 0.85 g of barium acetate. Then, the resultant was dried at 110° C. Further, the temperature was raised from room temperature to 500° C. at a rate of 100° C./hour, and was kept at 500° C. for 2 hours. Thus, an NSR catalyst was obtained. This NSR catalyst was compacted, and ground pellets having a diameter of 0.5 to 1 mm were obtained. An amount of Ba supported in this NSR catalyst was 0.096 mol relative to 100 g of the mixture of the catalyst for purification of exhaust gas of Example 1 after the thermal durability test (1) and the catalyst obtained in Preparation Example 2.

Example 9

An NSR catalyst was prepared in the same manner as in Example 8, except that 3.15 g of the catalyst for purification of exhaust gas of Example 3 after the thermal durability test (1) (in the catalyst amount such that the amount of Pt supported was equal to that in Example 8) was used in place of the catalyst for purification of exhaust gas of Example 1 after the thermal durability test (1). An amount of Ba supported in this NSR catalyst was 0.093 mol relative to 100 g of the mixture of the catalyst for purification of exhaust gas of Example 3 after the thermal durability test (1) and the catalyst obtained in Preparation Example 2.

Example 10

An NSR catalyst was prepared in the same manner as in Example 8, except that 3.22 g of the catalyst for purification of exhaust gas of Example 4 after the thermal durability test (1) (in the catalyst amount such that the amount of Pt supported was equal to that in Example 8) was used in place of the catalyst for purification of exhaust gas of Example 1 after the thermal durability test (1). An amount of Ba supported in this NSR catalyst was 0.091 mol relative to 100 g of the mixture of the catalyst for purification of exhaust gas of Example 4 after the thermal durability test (1) and the catalyst obtained in Preparation Example 2.

Example 11

An NSR catalyst was prepared in the same manner as in Example 8, except that 3.29 g of the catalyst for purification of exhaust gas of Example 5 after the thermal durability test (1) (in the catalyst amount such that the amount of Pt supported was equal to that in Example 8) was used in place of the catalyst for purification of exhaust gas of Example 1 after the thermal durability test (1). An amount of Ba supported in this NSR catalyst was 0.089 mol relative to 100 g of the mixture of the catalyst for purification of exhaust gas of Example 5 after the thermal durability test (1) and the catalyst obtained in Preparation Example 2.

Comparative Example 3

An NSR catalyst was prepared in the same manner as in Example 8, except that 3 g of the catalyst of Comparative Example 1 after the thermal durability test (1) (in the catalyst amount such that the amount of Pt supported was equal to that in Example 8) was used in place of the catalyst for purification of exhaust gas of Example 1 after the thermal durability test (1). An amount of Ba supported in this NSR catalyst was 0.097 mol relative to 100 g of the mixture of the catalyst of Comparative Example 1 after the thermal durability test (1) and the catalyst obtained in Preparation Example 2.

<Catalytic Performance Evaluation Test (3)>

The NSR catalysts were each placed in the fixed bed flow type reactor. The catalyst amount was set to 1 g for the NSR catalyst of Comparative Example 3. As for the other NSR catalysts (Examples 8 to 11), the catalyst amounts were set such that each Pt amount and Ba amount were equal to those of the NSR catalyst of Comparative Example 3. A lean model gas [NO (400 ppm)/$C_3H_6$ (100 ppmC)/$O_2$ (5.5%)/$CO_2$ (10%)/$H_2O$ (5%)/$N_2$ (balance)] and a rich model gas [NO (400 ppm)/CO (3%)/$H_2$ (1%)/$C_3H_6$ (500 ppmC)/$CO_2$ (10%)/$H_2O$ (5%)/$N_2$ (balance)] were alternately allowed to flow through the NSR catalyst with an entry gas temperature of 300° C. or 400° C. at a rate of 5 L/minute at intervals of lean/rich=60 seconds/3 seconds. Ten cycles of such alternations were performed. NOx concentrations of the entry gas and the exit gas were measured to determine an average NOx conversion ratio of last three cycles. Table 3 shows the result.

<Catalytic Performance Evaluation Test (4)>

After the catalytic performance evaluation test (3), a lean model gas and a rich model gas, which were respectively the aforementioned lean model gas and rich model gas each containing 37 ppm of $SO_2$, were alternately allowed to flow through the NSR catalyst at 400° C. at a rate of 5 L/minute at intervals of lean/rich=60 seconds/3 seconds. Forty cycles of such alternations were performed. NOx concentrations in the entry gas and in the exit gas were measured to determine a NOx conversion ratio in the final cycle. Table 3 shows the result. In addition, $SO_2$ concentrations of the entry gas and the exit gas were measured to determine an amount of sulfur adherent to the NSR catalyst.

<Catalytic Performance Evaluation Test (5)>

After the catalytic performance evaluation test (4), a model gas [CO (1300 ppm)/$H_2$ (900 ppm)/$C_3H_6$ (100 ppmC)/$CO_2$ (10%)/$H_2O$ (5%)/$N_2$ (balance)] containing no $SO_2$ was allowed to flow through the NSR catalyst with an entry gas temperature of 600° C. at a rate of 5 L/minute to form a slightly rich atmosphere, and a sulfur desorption treatment was performed for 10 minutes. In this event, the $SO_2$ concentration in the exit gas was measured over time to determine an amount of sulfur desorbed and a peak time of the sulfur desorption. From this amount of sulfur desorbed and the amount of sulfur adherent to the NSR catalyst determined in the catalytic performance evaluation test (4), an amount of sulfur remaining in the NSR catalyst after the sulfur desorption treatment was calculated. Thus, ratios of amounts of sulfur remaining in the NSR catalysts of Examples 8 to 11 to an amount of sulfur remaining in the NSR catalyst of Comparative Example 3 were determined. Table 3 shows these results.

TABLE 3

|  | Without sulfur | | With sulfur final NOx | Sulfur desorption treatment at 600° C. | |
| --- | --- | --- | --- | --- | --- |
|  | average NOx conversion ratio | | conversion ratio | amount of sulfur remaining | peak time of sulfur |
|  | 300° C. [%] | 400° C. [%] | 400° C. [%] | after treatment (relative ratio) | desorption [seconds] |
| Ex. 8 | 69.9 | 76.1 | 45.6 | 0.999 | 156 |
| Ex. 9 | 74.0 | 80.5 | 61.7 | 0.926 | 174 |
| Ex. 10 | 81.5 | 88.4 | 67.2 | 0.922 | 189 |
| Ex. 11 | 84.9 | 90.8 | 72.2 | 0.935 | 195 |
| Comp. Ex. 3 | 68.2 | 76.0 | 45.2 | 1 | 150 |

As is apparent from the results shown in Table 3, as the amount of the ceria supported was increased, a higher NOx conversion performance was exhibited in the absence of sulfur at both the entry gas temperatures of 300° C. and 400° C. This is conceivably because the addition of ceria suppressed the grain growth of the noble metal (Pt) and maintained the NOx storage performance in a lean condition.

Moreover, in the co-existence of sulfur also, it was found that as the amount of the ceria supported was increased, the NOx conversion ratio was further increased, and a higher sulfur-poisoning resistance was exhibited. This is conceivably because the addition of ceria suppressed the grain growth of the noble metal (Pt) and maintained the NOx storage performance near the noble metal (Pt).

Further, it was found that in the cases of using the NSR catalysts of the present invention supporting the ceria (Examples 8 to 11), the sulfur desorption treatment at 600° C. enabled to decrease the amount of sulfur remaining in the NSR catalysts in comparison with the case of using the NSR catalyst comprising no ceria (Comparative Example 3). It was found that the NSR catalysts of the present invention supporting the ceria (Examples 8 to 11) were catalysts not only excellent in sulfur-poisoning resistance but also readily recovered from sulfur poisoning through the control to the rich atmosphere. On the other hand, it was found that as the amount of the ceria supported was increased, the peak time of the sulfur desorption was delayed. This is because the reducing agent is wastefully consumed due to the OSC performance of the NSR catalyst. This revealed that the amount of the ceria supported was preferably small from the viewpoint of controlling sulfur poisoning recovery.

Example 12

A catalyst for purification of exhaust gas in which Pt was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 5.0 parts by mass. In the obtained catalyst for purification of exhaust gas, an amount of Pt supported was 1.09 parts by mass relative to 100 parts by mass of the catalyst support, and a molar ratio between Ce and Pt (Ce/Pt) was 5.0.

Moreover, a catalyst for purification of exhaust gas in which Pd was supported on a surface of a catalyst support composed of a ceria-supporting AZT composite oxide powder was prepared in the same manner as in Example 1, except that the Ce concentration in the ceria precursor solution was changed such that when 100 parts by mass of the AZT composite oxide powder obtained in Preparation Example 1 was impregnated with the ceria precursor solution, the amount of the ceria supported was 5.0 parts by mass; and that an aqueous solution of dinitrodiammine palladium (Pd concentration: 4.5% by mass) was used in place of the aqueous solution of dinitrodiammine platinum. In the obtained catalyst for purification of exhaust gas, an amount of Pd supported was 0.82 parts by mass relative to 100 parts by mass of the catalyst support, and a molar ratio between Ce and Pd (Ce/Pd) was 3.6.

A slurry was prepared by adding 61 g of the catalyst for purification of exhaust gas in which Pt was supported, 30.5 g of the catalyst for purification of exhaust gas in which Pd was supported, 13 g of the catalyst obtained in Preparation Example 2, and 10 g of an alumina sol to ion-exchanged water. A 35-cc monolithic substrate was coated with the slurry in such a manner that a proportion of a catalyst layer to be formed was 8 g/L. The resultant was dried at 250° C. Thus, a catalyst layer comprising alumina in a proportion of 9% by mass was formed. Then, the substrate supporting the catalyst layer was impregnated with an aqueous solution of barium acetate, and dried at 110° C. Thus, an NSR catalyst test piece supporting barium in a proportion of 0.2 mol/L was obtained.

Comparative Example 4

A catalyst in which Pt and Pd were supported on a surface of an AZT composite oxide powder (Pt—Pd-supporting AZT composite oxide powder) was prepared in the same manner as in Comparative Example 2, except that the aqueous solution of dinitrodiammine platinum and the aqueous solution of dinitrodiammine palladium were used for the impregnation such that a total amount of Pt and Pd supported was 1.0 parts by mass relative to 100 parts by mass of the AZT composite oxide powder obtained in Preparation Example 1.

An NSR catalyst test piece supporting barium was obtained in the same manner as in Example 12, except that 91.5 g of the Pt—Pd-supporting AZT composite oxide powder was used in place of the catalyst for purification of exhaust gas in which Pt was supported and the catalyst for purification of exhaust gas in which Pd was supported prepared in Example 12 such that a total amount of Pt and Pd supported and a ratio of Pt and Pd were equal to those in Example 12.

Comparative Example 5

A catalyst in which Pt and Pd were supported on a surface of a catalyst support composed of a ceria-supporting AZT composite oxide powder (Pt—Pd-supporting, ceria-containing AZT composite oxide powder) was prepared in the same manner as in Example 7, except that the Ce concentration in the ceria precursor solution was changed such that when 100 parts by mass of the AZT composite oxide powder obtained in Preparation Example 1 was impregnated with the ceria precursor solution, the amount of the ceria supported was 15.0 parts by mass; and that the aqueous solution of dinitrodiammine platinum and the aqueous solution of dinitrodiammine palladium were used for the impregnation such that a total amount of Pt and Pd supported was 1.0 parts by mass relative to 100 parts by mass of the catalyst support. In the obtained catalyst, a molar ratio of Ce to Pt and Pd (Ce/[Pt+Pd]) was 12.7.

An NSR catalyst test piece supporting barium was obtained in the same manner as in Example 12, except that 91.5 g of the Pt—Pd-supporting, ceria-containing AZT composite oxide powder was used in place of the catalyst for purification of exhaust gas in which Pt was supported and the catalyst for purification of exhaust gas in which Pd was supported prepared in Example 12 such that a total amount of Pt and Pd supported and a ratio of Pt and Pd were equal to those in Example 12.

Comparative Example 6

A catalyst in which Pt and Pd were supported on a surface of a catalyst support composed of a ceria-supporting mixture powder (Pt—Pd-supporting, ceria-containing mixture powder) was prepared in the same manner as in Example 7, except that a mixture powder of alumina and a zirconia-titania composite oxide (titania content: 30 mol %, hereinafter abbreviated as "ZT composite oxide") (alumina:ZT composite oxide (mass ratio)=50:50) was used in place of the AZT composite oxide powder; that the Ce concentration in the ceria precursor solution was changed such that when 100 parts by mass of this mixture powder was impregnated with the ceria precursor solution, the amount of the ceria supported was 5.3 parts by mass; and that the aqueous solution of dinitrodiammine platinum and the aqueous solution of dinitrodiammine palladium were used for the impregnation such that a total amount of Pt and Pd supported was 1.0 parts by mass relative to 100 parts by mass of the catalyst support. In the obtained catalyst, a molar ratio of Ce to Pt and Pd (Ce/[Pt+Pd]) was 4.4.

An NSR catalyst test piece supporting barium was obtained in the same manner as in Example 12, except that 91.5 g of the Pt—Pd-supporting, ceria-containing mixture powder was used in place of the catalyst for purification of exhaust gas in which Pt was supported and the catalyst for purification of exhaust gas in which Pd was supported prepared in Example 12 such that a total amount of Pt and Pd supported and a ratio of Pt and Pd were equal to those in Example 12.

<Thermal Durability Test (2)>

A thermal durability test was conducted in the same manner as in the thermal durability test (1), except that after one of the obtained NSR catalyst test pieces was packed into a silica glass tube, a lean gas and a rich gas having the same compositions as those in the thermal durability test (1) were alternately allowed to flow at a rate of 11 L/minute at intervals of lean/rich=110 seconds/10 seconds.

<Catalytic Performance Evaluation Test (6)>

After the thermal durability test (2), one of the NSR catalyst test pieces was placed in the fixed bed flow type reactor. While a lean model gas [NO (400 ppm)/$SO_2$ (60 ppm)/$C_3H_6$ (100 ppmC)/$O_2$ (5.5%)/$CO_2$ (10%)/$H_2O$ (5%)/$N_2$ (balance)] and a rich model gas [NO (400 ppm)/$SO_2$ (60 ppm)/CO (6%)/$H_2$ (2%)/$C_3H_6$ (500 ppmC)/$CO_2$ (10%)/$H_2O$ (5%)/$N_2$ (balance)] were alternately allowed to flow through the NSR catalyst with an entry gas temperature of 400° C. at a rate of 15 L/minute at intervals of lean/rich=60 seconds/3 seconds. Forty cycles of such alternations were performed.

<Catalytic Performance Evaluation Test (7)>

After the catalytic performance evaluation test (6), a model gas [CO (1300 ppm)/$H_2$ (900 PPm)/$C_3H_6$ (100 ppmC)/$CO_2$ (10%)/$H_2O$ (5%)/$N_2$ (balance)] was allowed to flow through the NSR catalyst with an entry gas temperature of 600° C. at a rate of 30 L/minute to form a slightly rich atmosphere, and a sulfur desorption treatment was performed for 10 minutes.

The catalytic performance evaluation tests (6) and (7) were repeated four times. In the first cycle and the fortieth cycle of each catalytic performance evaluation test (6), NOx concentrations of the entry gas and the exit gas were measured to calculate a NOx conversion ratio in the co-existence of sulfur. Moreover, in the catalytic performance evaluation test (6), S concentrations of the entry gas and the exit gas were measured to determine an amount of sulfur adherent to the NSR catalyst. Further, during the sulfur desorption treatment in the catalytic performance evaluation test (7), the S concentration in the exit gas was measured over time to determine an amount of sulfur desorbed. From this amount of sulfur desorbed and the amount of sulfur adherent to the NSR catalyst, an amount of sulfur remaining in the NSR catalyst after the sulfur desorption treatment was calculated. Table 4 shows these results. Note that, regarding the amount of sulfur remaining in the NSR catalyst, the result after the fourth sulfur desorption treatment is shown.

TABLE 4

|  | NOx conversion ratio [%] with sulfur in catalytic performance evaluation test (6) 1st cycle → 40th cycle | | | | Amount of sulfur remaining after catalytic performance evaluation tests (6) and (7) were repeated 4 times | |
| --- | --- | --- | --- | --- | --- | --- |
|  | 1st | 2nd | 3rd | 4th | [g/L] | (relative ratio) |
| Ex. 12 | 85.6→70.5 | 81.7→63.2 | 81.4→61.4 | 81.9→60.3 | 1.80 | 0.71 |
| Comp. Ex. 4 | 82.5→68.7 | 78.9→62.8 | 72.6→56.2 | 71.2→53.7 | 2.53 | 1 |
| Comp. Ex. 5 | 89.1→76.6 | 83.6→64.4 | 81.5→58.6 | 81.5→56.4 | 2.04 | 0.81 |
| Comp. Ex. 6 | 87.8→76.0 | 83.6→64.9 | 79.8→58.0 | 77.2→53.7 | 2.18 | 0.86 |

Total amount of sulfur passed: 6.17 g/L

As is apparent from the result of the NOx conversion ratio shown in Table 4, it was found that the NSR catalyst in which a predetermined amount of the ceria was supported on the surface of the AZT composite oxide (Example 12) had an approximately constant NOx conversion ratio in the NOx treatments in the first cycles (immediately after the sulfur desorption treatments) of the second and subsequent catalytic performance evaluation tests (6), and exhibited a stable NOx conversion performance. This revealed that the NOx storage-reduction catalyst of the present invention comprising the catalyst for purification of exhaust gas of the present invention and the NOx storage material supported thereon readily recovered the catalytic performance by the sulfur desorption treatment. Moreover, in the NOx treatments in the fortieth cycles in the co-existence of sulfur of the second and subsequent catalytic performance evaluation tests (6) also, the NOx conversion ratio was approximately constant, revealing that the deterioration of the NSR catalyst of the present invention due to the repeated use was suppressed.

In contrast, it was found that the NSR catalyst comprising no ceria (Comparative Example 4) had a NOx conversion ratio gradually decreased in both of the NOx treatments in the first cycles (immediately after the sulfur desorption treatments) and in the fortieth cycles in the co-existence of sulfur of the second and subsequent catalytic performance evaluation tests (6). This revealed that the NSR catalyst of Comparative Example 4 was inferior to the NSR catalyst of Example 12 of the present invention in sulfur-poisoning resistance.

Moreover, the NSR catalyst in which an excessive amount of the ceria was supported on the surface of the AZT composite oxide (Comparative Example 5) exhibited a NOx conversion performance equivalent to that of the NSR catalyst of Example 12 in the NOx treatments in the first cycles (immediately after the sulfur desorption treatments) of the third and subsequent catalytic performance evaluation tests (6). However, the catalytic performance was not recovered as much as the NSR catalyst of Example 12 even when the sulfur desorption treatment was performed by allowing plenty of reducing agents to flow in the catalytic performance evaluation test (7). This revealed, in addition to the fact that there was an upper limit for the amount of the ceria supported, that the NSR catalyst of Comparative Example 5 was inferior to the NSR catalyst of Example 12 of the present invention in the performance as a NOx storage-reduction catalyst regarding a decrease in the fuel efficiency.

Further, it was found that the NSR catalyst in which a predetermined amount of the ceria was supported on the surface of the mixture powder of the alumina and the ZT composite oxide (Comparative Example 6) had a NOx conversion ratio gradually decreased in both of the NOx treatments in the first cycles (immediately after the sulfur desorption treatments) and in the fortieth cycles in the co-existence of sulfur of the second and subsequent catalytic performance evaluation tests (6). This revealed that the NSR catalyst of Comparative Example 6 was inferior to the NSR catalyst of Example 12 of the present invention in sulfur-poisoning resistance.

Furthermore, it was found that the NSR catalyst in which a predetermined amount of the ceria was supported on the surface of the AZT composite oxide (Example 12) exhibited a high NOx conversion performance in the NOx treatment in the fortieth cycle in the co-existence of sulfur of the fourth catalytic performance evaluation test (6) in comparison with the NSR catalyst comprising no ceria (Comparative Example 4), the NSR catalyst in which an excessive amount of the ceria was supported on the surface of the AZT composite oxide (Comparative Example 5), and the NSR catalyst in which a predetermined amount of the ceria was supported on the surface of the mixture powder of the alumina and the ZT composite oxide (Comparative Example 6). This revealed that the NOx storage-reduction catalyst of the present invention comprising the catalyst for purification of exhaust gas of the present invention and the NOx storage material supported thereon was excellent in sulfur-poisoning resistance.

Further, as is apparent from the result of the amount of sulfur remaining shown in Table 4, it was found that the NSR catalysts in which the ceria was supported (Example 12, Comparative Examples 5 and 6) had a small amount of sulfur remaining after the catalytic performance evaluation tests (6) and (7) were repeated four times, in comparison with the NSR catalyst comprising no ceria (Comparative Example 4). This is conceivably because the ceria suppressed the Pt grain growth, so that many active sites were maintained, readily desorbing sulfur. In addition, it was found that the NSR catalyst of Comparative Example 6 had a large amount of sulfur remaining after the catalytic performance evaluation tests (6) and (7) were repeated four times, in comparison with the NSR catalyst of Example 12 in which the ceria was supported in an almost equivalent amount. This is conceivably because sulfur poisoning was not sufficiently suppressed by the alumina in the mixture powder.

The above results revealed that the NOx storage-reduction catalyst of the present invention comprising the catalyst for purification of exhaust gas of the present invention and the NOx storage material supported thereon was superior to the NOx storage-reduction catalysts of Comparative Examples 4 to 6 in heat resistance and sulfur-poisoning resistance.

As has been described above, the present invention makes it possible to obtain a catalyst for purification of exhaust gas, which has a high heat resistance and sulfur-poisoning resistance and exhibits a high catalytic activity even when the catalyst is exposed to high temperature and sulfur.

Thus, a catalyst supporting a NOx storage material on the catalyst for purification of exhaust gas of the present invention is excellent in heat resistance, sulfur-poisoning resistance, and NOx conversion performance. Therefore, such a catalyst is useful as a NOx storage-reduction catalyst or the like for purification of exhaust gas containing a nitrogen compound and sulfur oxide emitted from an internal combustion engine of an automobile or other similar sources.

What is claimed is:

1. A catalyst for purification of exhaust gas, comprising a first catalyst comprising:
   a first catalyst support comprising
      a first composite oxide composed of alumina, zirconia, and titania, and
      ceria supported on a surface of the first composite oxide in an amount of 0.5 to 10 parts by mass relative to 100 parts by mass of the first composite oxide; and
   a first noble metal supported on a surface of the first catalyst support in an amount of 0.05 to 5.0 parts by mass in terms of metal relative to 100 parts by mass of the first catalyst support.

2. The catalyst for purification of exhaust gas according to claim 1, wherein an amount of the ceria supported per specific surface area of the first composite oxide is 0.4 to 5 $\mu mol/(m^2/g)$.

3. The catalyst for purification of exhaust gas according to claim 1, wherein after the catalyst for purification of exhaust gas is introduced into a mixture solution containing concentrated nitric acid and concentrated hydrochloric acid at a volume ratio of 1:3 and left standing for one hour, an amount of cerium eluted into a filtrate is 5% or more relative to a total amount of cerium in the catalyst for purification of exhaust gas.

4. The catalyst for purification of exhaust gas according to claim 1, wherein a molar ratio between the cerium and the first noble metal (Ce/first noble metal) is 0.5 to 10.

5. The catalyst for purification of exhaust gas according to claim 1, wherein the first composite oxide has an alumina content of 30 to 70% by mass.

6. The catalyst for purification of exhaust gas according to claim 1, wherein the titania accounts for 20 to 60 mol % of a total amount of the zirconia and the titania in the first composite oxide.

7. A NOx storage-reduction catalyst comprising:
   the catalyst for purification of exhaust gas according to claim 1; and
   at least one NOx storage material selected from the group consisting of alkali metals and alkaline earth metals.

8. The NOx storage-reduction catalyst according to claim 7, wherein the catalyst for purification of exhaust gas comprises two or more types of the first catalyst.

9. The NOx storage-reduction catalyst according to claim 7, wherein the NOx storage material is supported on a surface of the first catalyst.

10. The NOx storage-reduction catalyst according to claim 7, wherein a content of the NOx storage material is 0.01 to 0.3 mol per 100 g of the first catalyst.

11. The NOx storage-reduction catalyst according to claim 7, further comprising a second catalyst comprising:
   a second catalyst support comprising a second composite oxide composed of alumina, zirconia, and titania but not comprising ceria; and
   a second noble metal supported on a surface of the second catalyst support.

12. The NOx storage-reduction catalyst according to claim 11, wherein the NOx storage material is supported on a surface of the second catalyst.

13. The NOx storage-reduction catalyst according to claim 11, wherein an amount of the NOx storage material supported is 0.01 to 0.3 mol per 100 g of the first catalyst and the second catalyst in total.

14. A method for purifying exhaust gas, comprising bringing exhaust gas containing nitrogen oxide and sulfur oxide into contact with the NOx storage-reduction catalyst according to claim 7.

* * * * *